US012792167B2

(12) United States Patent
Hsu et al.

(10) Patent No.: US 12,792,167 B2
(45) Date of Patent: Nov. 10, 2026

(54) DISPLAY PANEL

(71) Applicant: AUO Corporation, Hsinchu City (TW)

(72) Inventors: Chia-Chun Hsu, Hsinchu City (TW); Yu-Ping Kuo, Hsinchu City (TW); Hsiao-Wei Cheng, Hsinchu City (TW)

(73) Assignee: AUO Corporation, Hsinchu City (TW)

( * ) Notice: Subject to any disclaimer, the term of this patent is extended or adjusted under 35 U.S.C. 154(b) by 0 days.

(21) Appl. No.: 19/218,578

(22) Filed: May 26, 2025

(65) Prior Publication Data

US 2025/0383728 A1 Dec. 18, 2025

(30) Foreign Application Priority Data

Jun. 13, 2024 (TW) ................................ 113121946

(51) Int. Cl.
*G06F 3/041* (2006.01)
*G02F 1/1333* (2006.01)
*G02F 1/1335* (2006.01)

(52) U.S. Cl.
CPC .......... *G06F 3/041* (2013.01); *G02F 1/13338* (2013.01); *G02F 1/133382* (2013.01); *G02F 1/133514* (2013.01)

(58) Field of Classification Search
CPC ................. G06F 3/041; G02F 1/13338; G02F 1/133382; G02F 1/133514; G09F 9/30
See application file for complete search history.

(56) References Cited

U.S. PATENT DOCUMENTS

2018/0321782 A1* 11/2018 Qin ......................... G06F 3/047
2022/0043295 A1* 2/2022 Liu ................... G02F 1/133382
2023/0367438 A1* 11/2023 Li ......................... G06F 3/0412

FOREIGN PATENT DOCUMENTS

| | | |
|---|---|---|
| CN | 206833395 | 1/2018 |
| CN | 110297572 | 10/2019 |
| TW | I882629 | 5/2025 |

* cited by examiner

*Primary Examiner* — Chanh D Nguyen
*Assistant Examiner* — Jarurat Suteerawongsa
(74) *Attorney, Agent, or Firm* — JCIPRNET

(57) ABSTRACT

A display panel including a pixel array layer and a color resist layer. The pixel array layer is disposed on a substrate and includes a plurality of signal lines arranged along a direction. The color resist layer includes a plurality of pixel units. The pixel units are sequentially arranged along the direction, and each pixel unit includes a first color resist, a second color resist and a third color resist. Each signal line corresponds to a boundary between the first color resist and the second color resist, a boundary between the second color resist and the third color resist, or a boundary between the third color resist and the first color resist. An interval between two adjacent signal lines corresponds to N color resists, wherein N is a positive integer greater than 1 and is not a multiple of 3.

7 Claims, 10 Drawing Sheets

DISPLAY PANEL

CROSS-REFERENCE TO RELATED APPLICATION

This application claims the priority benefit of Taiwan application serial no. 113121946, filed on Jun. 13, 2024. The entirety of the above-mentioned patent application is hereby incorporated by reference herein and made a part of this specification.

BACKGROUND

Technical Field

The disclosure relates to a display panel.

Description of Related Art

Touchscreen technology has brought a new era to mobile phones and tablet computers, and is widely applied to notebook computers, desktop computer monitors, and all-in-one computers. To transform a display into a "touch panel," it is necessary to combine two completely different functions: display and touch. In the past, a touch sensor was added to the display by a "laminated" approach. Recently, technology has developed embedded displays that directly integrate the touch sensor into the display. However, touch signal lines disposed in the pixel array layer cause problems such as color shift, light leakage in a dark state, and contrast ratio degradation at a front viewing angle or a lateral viewing angle.

SUMMARY

The disclosure provides a display panel, to which a color shift at a lateral viewing angle due to reflections from the signal lines does not occur. Light leakage in a dark state and contrast ratio degradation at a front viewing angle or a lateral viewing angle are also avoided.

According to an embodiment of the disclosure, a display panel including a substrate, a pixel array layer, and a color resist layer is provided. The substrate has a surface. The pixel array layer is disposed on the surface and includes a plurality of signal lines arranged along a first direction. The color resist layer is disposed on the pixel array layer and includes a plurality of pixel units. The plurality of pixel units are sequentially arranged along the first direction. Each of the plurality of pixel units includes a plurality of color resists. The plurality of color resists of each of the plurality of pixel units include a first color resist, a second color resist, and a third color resist sequentially arranged along the first direction. The first color resist, the second color resist, and the third color resist are different in color. Each of the plurality of signal lines corresponds to a boundary between the first color resist and the second color resist, a boundary between the second color resist and the third color resist, or a boundary between the third color resist and the first color resist. An interval between adjacent two of the plurality of signal lines corresponds to N of the plurality of color resists. N is a positive integer greater than 1, and N is not a multiple of 3.

According to another embodiment of the disclosure, a display panel including a substrate, a pixel array layer, and a color resist layer is provided. The substrate has a surface. The pixel array layer is disposed on the surface and includes a plurality of signal line groups arranged along a first direction. Each of the plurality of signal line groups includes M signal lines arranged along the first direction. M is a positive integer greater than 1. The color resist layer is disposed on the pixel array layer and includes a plurality of pixel units. The plurality of pixel units are sequentially arranged along the first direction. Each of the plurality of pixel units includes a plurality of color resists. The plurality of color resists of each of the plurality of pixel units include a first color resist, a second color resist, and a third color resist sequentially arranged along the first direction. The first color resist, the second color resist, and the third color resist are different in color. Each of the plurality of signal lines corresponds to a boundary between the first color resist and the second color resist, a boundary between the second color resist and the third color resist, or a boundary between the third color resist and the first color resist. An interval between adjacent two of the M signal lines in each of the plurality of signal line groups corresponds to one of the plurality of color resists. An interval between adjacent two of the plurality of signal line groups corresponds to N of the plurality of color resists. A sum of M and N is a positive integer greater than 3, and the sum of M and N is not a multiple of 3.

Based on the above, the display panel provided in the embodiment of the disclosure has a special signal line configuration. A signal line does not need to be disposed at each color resist boundary, thereby avoiding light leakage in a dark state and contrast ratio degradation at a front viewing angle or a lateral viewing angle. Color shift caused by reflection from the signal lines at a lateral viewing angle is also avoided.

To make the features and advantages of the disclosure more comprehensible, several embodiments accompanied with drawings are described in detail as follows.

DESCRIPTION OF THE EMBODIMENTS

Figure 1A:
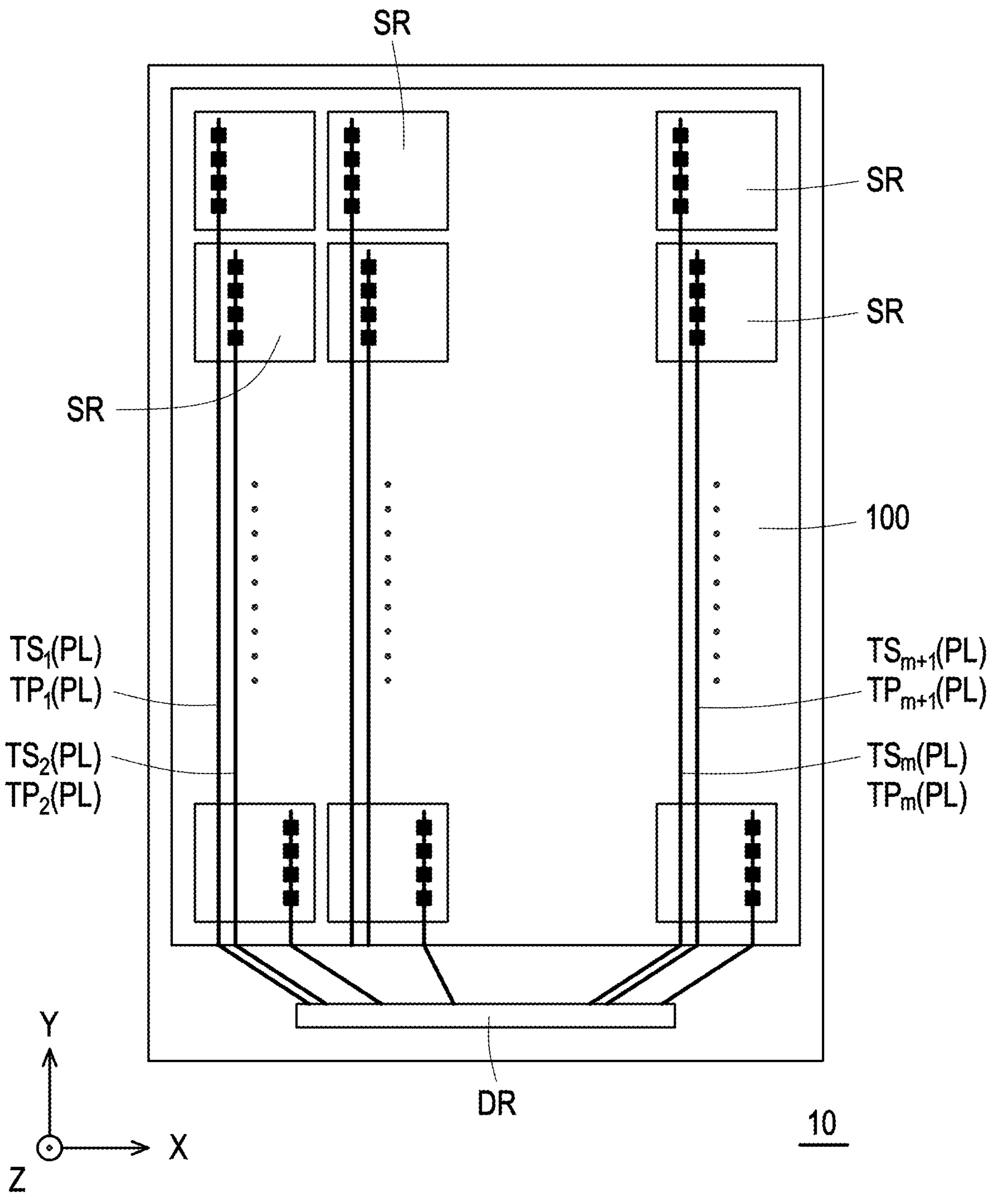
FIG. 1A is a schematic diagram of a display panel according to some embodiments of the disclosure.
Figure 1B:
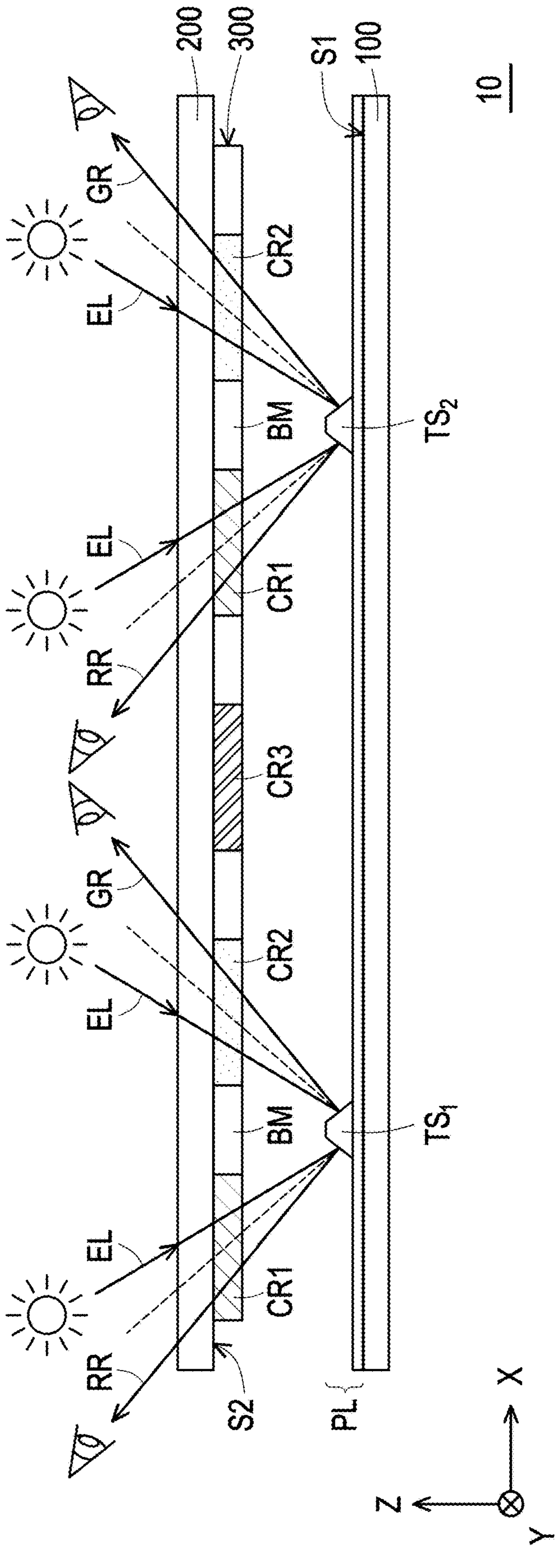
FIG. 1B is a cross-sectional schematic diagram of a display panel according to an embodiment of the disclosure.
Figure 1C:
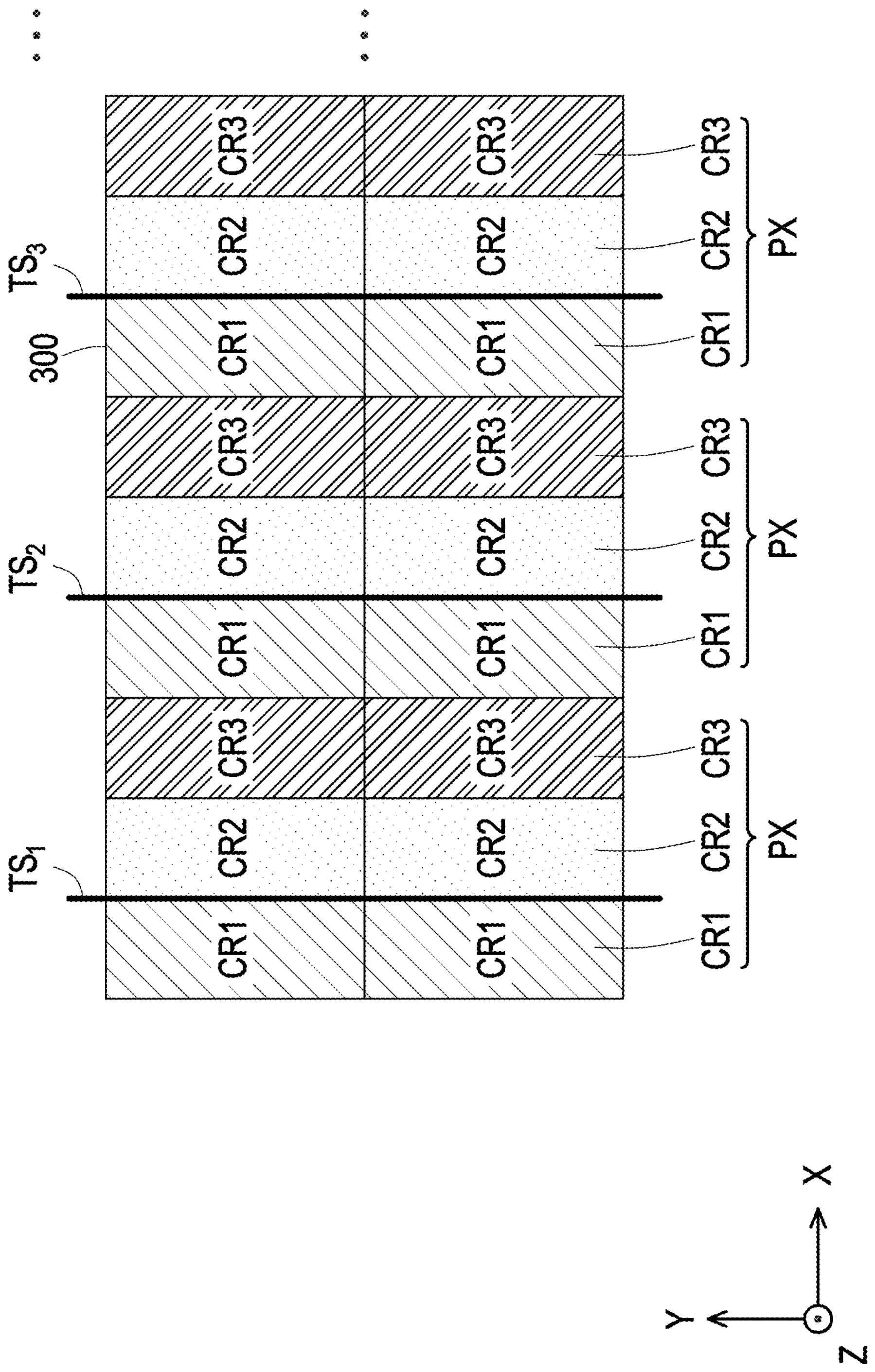
FIG. 1C is a schematic diagram of a display panel according to an embodiment of the disclosure.

Referring to FIG. 1A, FIG. 1B, and FIG. 1C, a display panel 10 includes a first substrate 100, a pixel array layer PL, a second substrate 200, and a color resist layer 300. The first substrate 100 has a first surface S1. The second substrate 200 has a second surface S2. The pixel array layer PL is disposed on the first surface S1 and includes a plurality of gate lines of a TFT array, a plurality of data lines of the TFT array, and a plurality of signal lines $TS_1$, $TS_2$ . . . $TS_m$, $TS_{m+1}$ . . . . It is particularly noted that the signal lines $TS_1$, $TS_2$ . . . $TS_m$, $TS_{m+1}$ . . . are not the gate lines and the data lines of the TFT array. In addition, for the sake of understanding, the gate lines and the data lines of the TFT array are not shown.

The color resist layer 300 is disposed on the second surface S2 and is located above the pixel array layer PL. The display panel 10 may be implemented as an embedded touch panel, and the signal lines $TS_1$, $TS_2$ . . . $TS_m$, $TS_{m+1}$ . . . are touch signal lines and are respectively connected between a plurality of touch sensors SR and a controller DR. However, the disclosure is not limited thereto. In some embodiments, the display panel 10 is not a touch panel, and the signal lines $TS_1$, $TS_2$ . . . $TS_m$, $TS_{m+1}$ . . . may be heating lines used for heating.

The color resist layer 300 includes a plurality of pixel units PX. The pixel units PX are sequentially arranged along an X direction, and each pixel unit PX includes a first color resist CR1, a second color resist CR2, and a third color resist CR3 sequentially arranged along the X direction. The first color resist CR1, the second color resist CR2, and the third color resist CR3 are different in color. In this embodiment, the colors of the first color resist CR1, the second color resist CR2, and the third color resist CR3 are red, green, and blue respectively, but are not limited thereto. In some embodiments, the colors of the first color resist CR1, the second color resist CR2, and the third color resist CR3 are green, blue, and red respectively. In some embodiments, the colors of the first color resist CR1, the second color resist CR2, and the third color resist CR3 are blue, red, and green respectively.

As shown in FIG. 1B, each of the signal lines $TS_1$, $TS_2$ . . . $TS_m$, $TS_{m+1}$ . . . has a taper due to a limitation of a metal etching process. In this situation, when an environmental light (white light) EL enters the display panel 10, the environmental light EL is reflected by a side surface of each of the signal lines $TS_1$, $TS_2$ . . . $TS_m$, $TS_{m+1}$ . . . and then emitted out of the display panel 10, and the emitted light is formed as light having a color of the color resist that the environmental light EL passes through.

In the embodiments of FIG. 1A, FIG. 1B, and FIG. 1C, each of the signal lines $TS_1$, $TS_2$ . . . $TS_m$, $TS_{m+1}$ . . . is exemplarily disposed under a black matrix BM at a boundary between the first color resist CR1 and the second color resist CR2. At a position under the black matrix BM where none of the signal lines $TS_1$, $TS_2$ . . . $TS_m$, $TS_{m+1}$ . . . is disposed, a spacer may be disposed, but is not limited thereto. Therefore, as shown in FIG. 1B, when a user observes the display panel 10 from a lateral viewing angle from a +X direction toward a −X direction, a side surface of each of the signal lines $TS_1$, $TS_2$ . . . $TS_m$, $TS_{m+1}$ . . . facing the +X direction reflects the environmental light EL, and the user sees a reflected light GR having a color of the second color resist CR2, for example, a green reflected light GR. Similarly, when the user observes the display panel 10 from a lateral viewing angle from a −X direction toward a +X direction, a side surface of each of the signal lines $TS_1$, $TS_2$ . . . $TS_m$, $TS_{m+1}$ . . . facing the −X direction reflects the environmental light EL, and a reflected light RR having a color of the first color resist CR1 is seen, for example, a red reflected light RR. The above colored reflected lights may cause color shift in the display panel 10 at a lateral viewing angle.

To fully illustrate various embodiments of the disclosure, other embodiments of the disclosure are described below. It must be noted herein that the following embodiments differ from the above embodiments in a configuration manner of the signal lines, and descriptions of identical technical content are omitted. The omitted descriptions can be referred to the foregoing embodiments. In addition, the following embodiments also continue to use the reference numerals and some contents of the foregoing embodiments, and the same or similar elements are indicated by the same reference numerals.

Figure 2:
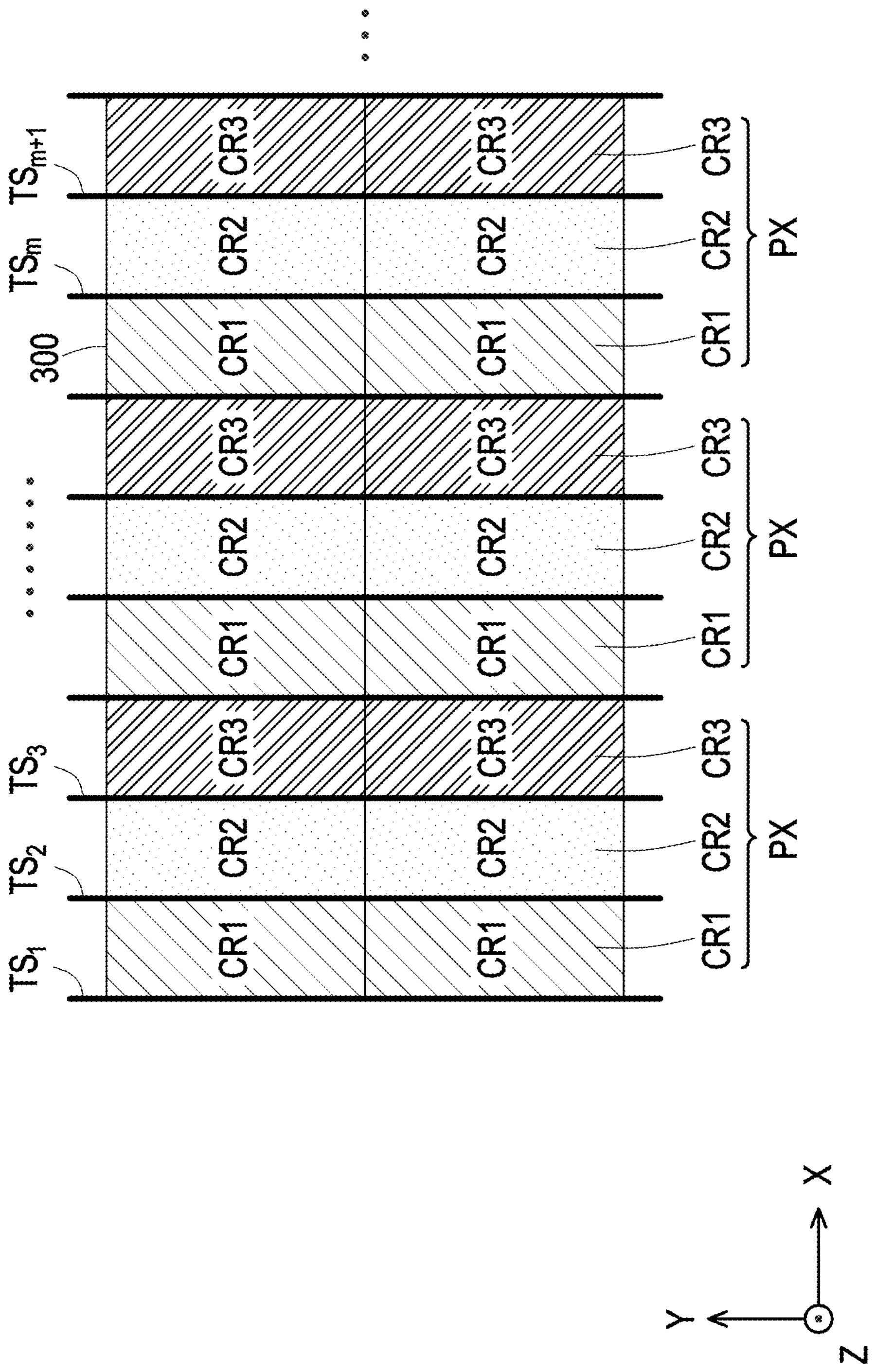
FIG. 2 is a schematic diagram of a display panel according to an embodiment of the disclosure.

Referring to FIG. 1A and FIG. 2, in another embodiment of the disclosure, the signal lines $TS_1$, $TS_2$ . . . $TS_m$, $TS_{m+1}$ . . . of the display panel 10 are sequentially disposed along an X direction under a black matrix BM at boundaries of adjacent color resists CR1, CR2, and CR3. In this situation, when a user observes the display panel 10 from a lateral viewing angle from a +X direction toward a −X direction, side surfaces of the signal lines $TS_1$, $TS_2$ . . . $TS_m$, $TS_{m+1}$ . . . facing the +X direction respectively generate reflected light having colors of the first color resist CR1, the second color resist CR2, the third color resist CR3, the first color resist CR1, the second color resist CR2, the third color resist CR3 . . . , for example, red reflected light, green reflected light, blue reflected light, red reflected light, green reflected light, blue reflected light . . . . Therefore, the above colored lights are mixed into white reflected light. Similarly, when the user observes the display panel 10 from a lateral viewing angle from a −X direction toward a +X direction, white reflected light is also seen. It is particularly noted that, compared with the display panel shown in FIG. 1C, color shift at a lateral viewing angle due to reflection from the signal lines does not occur to the display panel in this embodiment.

Figure 3:
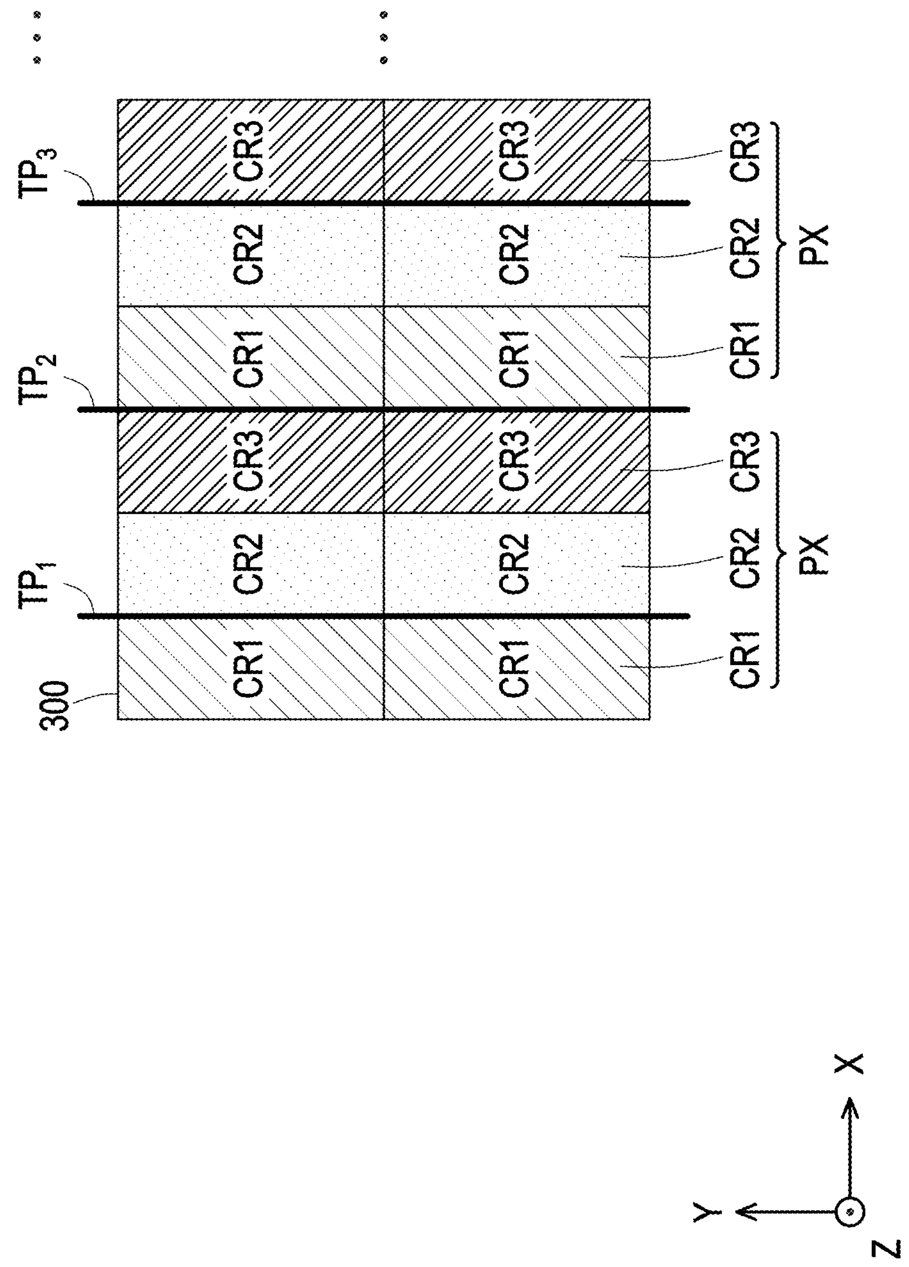
FIG. 3 is a schematic diagram of a display panel according to a first embodiment of the disclosure.

Referring to FIG. 1A and FIG. 3, in a first embodiment of the disclosure, a display panel 10 includes a first substrate 100, a pixel array layer PL, and a color resist layer 300.

The pixel array layer PL is disposed on a surface of the first substrate 100 and includes a plurality of gate lines of a TFT array, a plurality of data lines of the TFT array, and a plurality of signal lines $TP_1$, $TP_2$ . . . $TP_m$, $TP_{m+1}$ . . . . It is particularly noted that the signal lines $TP_1$, $TP_2$ . . . . $TP_m$, $TP_{m+1}$ . . . are not the gate lines and the data lines of the TFT array.

In some embodiments, the display panel 10 may be implemented as an embedded touch panel, and the signal lines $TP_1$, $TP_2$ . . . $TP_m$, $TP_{m+1}$ . . . are touch signal lines respectively connected between a plurality of touch sensors SR and a controller DR. However, the disclosure is not limited thereto. In some embodiments, the display panel 10 is not a touch panel, and the signal lines $TP_1$, $TP_2$ . . . $TP_m$, $TP_{m+1}$ . . . may be heating lines used for heating.

The color resist layer 300 is disposed on the pixel array layer PL and includes a plurality of pixel units PX. The pixel units PX are sequentially arranged along an X direction, and each pixel unit PX includes a first color resist CR1, a second color resist CR2, and a third color resist CR3 sequentially arranged along the X direction. The first color resist CR1, the second color resist CR2, and the third color resist CR3 are different in color. In this embodiment, the colors of the first color resist CR1, the second color resist CR2, and the third color resist CR3 are red, green, and blue respectively, but are not limited thereto. In some embodiments, the colors of the first color resist CR1, the second color resist CR2, and the third color resist CR3 are green, blue, and red respectively. In some embodiments, the colors of the first color resist CR1, the second color resist CR2, and the third color resist CR3 are blue, red, and green respectively.

It should be noted that FIG. 3 merely illustrates a schematic diagram of a partial region of the display panel 10. In fact, the structure shown in FIG. 3 is periodically arranged on the first substrate 100.

As shown in FIG. 3, the signal line $TP_1$ corresponds to a boundary between the first color resist CR1 and the second color resist CR2. The signal line $TP_2$ corresponds to a boundary between the third color resist CR3 and the first color resist CR1. The signal line $TP_3$ corresponds to a boundary between the second color resist CR2 and the third color resist CR3. An interval between adjacent two of the signal lines corresponds to two of the color resists. Specifically, an interval between the adjacent signal line $TP_1$ and signal line $TP_2$ corresponds to a second color resist CR2 and a third color resist CR3. An interval between the adjacent signal line $TP_2$ and signal line $TP_3$ corresponds to a first color resist CR1 and a second color resist CR2. An interval between the adjacent signal line $TP_3$ and signal line $TP_4$ (not shown) corresponds to a third color resist CR3 and a first color resist CR1.

When a user observes the display panel 10 from a lateral viewing angle from a +X direction toward a −X direction, light reflected by the signal line $TP_1$ and passing through the second color resist CR2, light reflected by the signal line $TP_2$ and passing through the first color resist CR1, and light reflected by the signal line $TP_3$ and passing through the third color resist CR3 are seen at the same time. The above light is mixed into white light. As described above, the structure shown in FIG. 3 is periodically arranged on the first substrate 100. Therefore, when the user observes the display panel 10 from a lateral viewing angle from a +X direction toward a −X direction, white reflected light is seen.

Similarly, when a user observes the display panel 10 from a lateral viewing angle from a −X direction toward a +X direction, light reflected by the signal line $TP_1$ and passing through the first color resist CR1, light reflected by the signal line $TP_2$ and passing through the third color resist CR3, and light reflected by the signal line $TP_3$ and passing through the second color resist CR2 are seen at the same time. The above light is mixed into white light. As described above, the structure shown in FIG. 3 is periodically arranged on the first substrate 100. Therefore, when the user observes the display panel 10 from a lateral viewing angle from a −X direction toward a +X direction, white reflected light is seen.

Color shift at a lateral viewing angle due to reflection from the signal lines does not occur to the display panel 10 of the first embodiment.

Compared to the embodiment shown in FIG. 2, in which the signal lines $TS_1$, $TS_2$ . . . $TS_m$, $TS_{m+1}$ . . . are disposed under the black matrix BM at all boundaries of adjacent color resists CR1, CR2, and CR3, the distribution density of the signal lines $TP_1$, $TP_2$ . . . $TP_m$, $TP_{m+1}$ . . . in the embodiment shown in FIG. 3 is reduced to one-half. Accordingly, problems of light leakage in a dark state and contrast ratio degradation at a front viewing angle or a lateral viewing angle caused by overly high distribution density of signal lines can be avoided. In some embodiments, a center (front viewing angle) contrast ratio of the display panel in FIG. 3 is increased by 10% compared to that of the display panel in FIG. 2, and a lateral (lateral viewing angle) contrast ratio of the display panel in FIG. 3 is increased by 17% compared to that of the display panel in FIG. 2.

Figure 4:
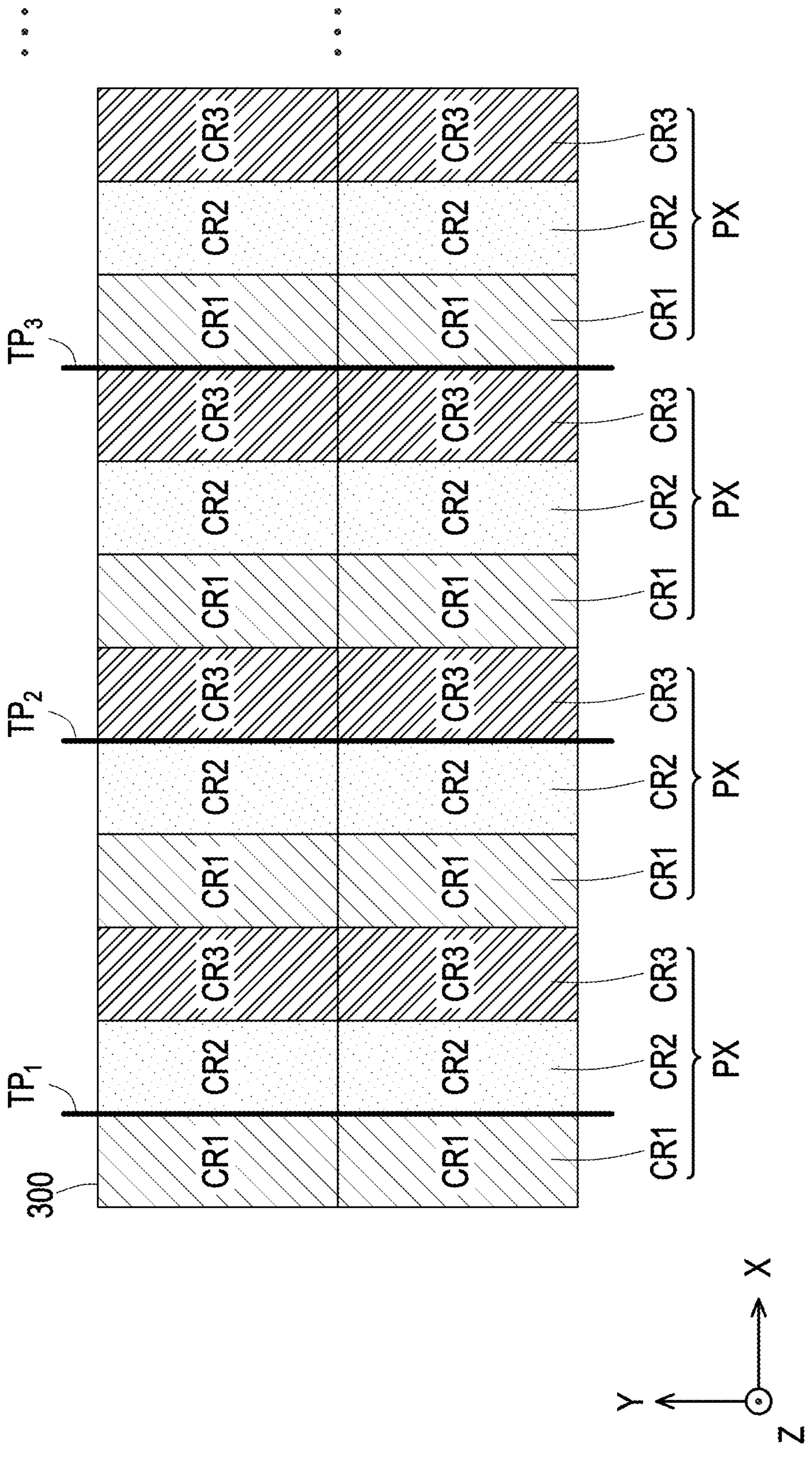
FIG. 4 is a schematic diagram of a display panel according to a second embodiment of the disclosure.

Referring to FIG. 1A and FIG. 4, FIG. 4 illustrates a schematic diagram of a display panel according to a second embodiment of the disclosure. It should be noted that FIG. 4 merely illustrates a schematic diagram of a partial region of the display panel of the second embodiment. In fact, the structure shown in FIG. 4 is periodically arranged on the first substrate 100.

The display panel of the second embodiment (FIG. 4) is generally the same in configuration as the display panel of the first embodiment (FIG. 3), and details are not repeated here. The display panel of the second embodiment is different from the display panel of the first embodiment in that the signal line $TP_1$ corresponds to a boundary between the first color resist CR1 and the second color resist CR2. The signal line $TP_2$ corresponds to a boundary between the second color resist CR2 and the third color resist CR3. The signal line $TP_3$ corresponds to a boundary between the third color resist CR3 and the first color resist CR1. An interval between adjacent two of the signal lines corresponds to four of the color resists. Specifically, an interval between the adjacent signal line $TP_1$ and signal line $TP_2$ corresponds to two second color resists CR2, a third color resist CR3, and a first color resist CR1. An interval between the adjacent signal line $TP_2$ and signal line $TP_3$ corresponds to two third color resists CR3, a first color resist CR1, and a second color resist CR2. An interval between the adjacent signal line $TP_3$ and signal line $TP_4$ (not shown) corresponds to two first color resists CR1, a second color resist CR2, and a third color resist CR3.

When a user observes the display panel 10 from a lateral viewing angle from a +X direction toward a −X direction, light reflected by the signal line $TP_1$ and passing through the second color resist CR2, light reflected by the signal line $TP_2$ and passing through the third color resist CR3, and light reflected by the signal line $TP_3$ and passing through the first color resist CR1 are seen at the same time. The above light is mixed into white light. As described above, the structure shown in FIG. 4 is periodically arranged on the first substrate 100. Therefore, when the user observes the display panel 10 from a lateral viewing angle from a +X direction toward a −X direction, white reflected light is seen.

Similarly, when a user observes the display panel 10 from a lateral viewing angle from a −X direction toward a +X direction, light reflected by the signal line $TP_1$ and passing through the first color resist CR1, light reflected by the signal line $TP_2$ and passing through the second color resist CR2, and light reflected by the signal line $TP_3$ and passing through the third color resist CR3 are seen at the same time. The above light is mixed into white light. As described above, the structure shown in FIG. 4 is periodically arranged on the first substrate 100. Therefore, when the user observes the display panel 10 from a lateral viewing angle from a −X direction toward a +X direction, white reflected light is seen.

Color shift at a lateral viewing angle due to reflection from the signal lines does not occur to the display panel 10 of the second embodiment.

Compared to the embodiment shown in FIG. 2, in which the signal lines $TS_1$, $TS_2$ . . . $TS_m$, $TS_{m+1}$ . . . are disposed under the black matrix BM at all boundaries of adjacent color resists CR1, CR2, and CR3, the distribution density of the signal lines $TP_1$, $TP_2$ . . . $TP_m$, $TP_{m+1}$ . . . in the second embodiment shown in FIG. 4 is reduced to one-fourth. Accordingly, problems of light leakage in a dark state and contrast ratio degradation at a front viewing angle or a lateral viewing angle caused by overly high distribution density of signal lines can be avoided.

Figure 5:
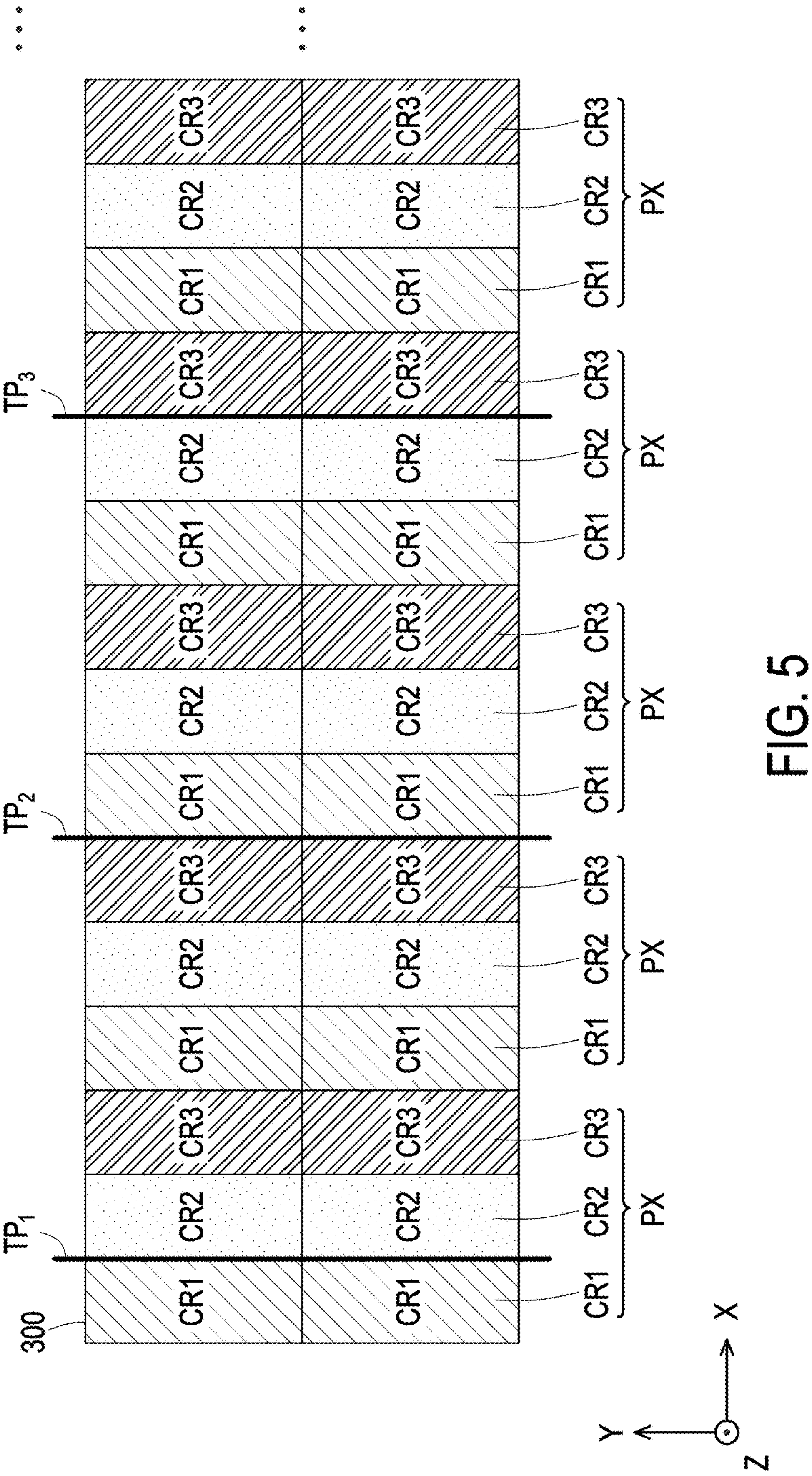
FIG. 5 is a schematic diagram of a display panel according to a third embodiment of the disclosure.

Referring to FIG. 1A and FIG. 5, FIG. 5 illustrates a schematic diagram of a display panel according to a third embodiment of the disclosure. It should be noted that FIG. 5 merely illustrates a schematic diagram of a partial region of the display panel of the third embodiment. In fact, the structure shown in FIG. 5 is periodically arranged on the first substrate 100.

The display panel of the third embodiment (FIG. 5) is generally the same in configuration as the display panel of the first embodiment (FIG. 3), and details are not repeated here. The display panel of the third embodiment is different from the display panel of the first embodiment in that the signal line $TP_1$ corresponds to a boundary between the first color resist CR1 and the second color resist CR2. The signal line $TP_2$ corresponds to a boundary between the third color resist CR3 and the first color resist CR1. The signal line $TP_3$ corresponds to a boundary between the second color resist CR2 and the third color resist CR3. An interval between adjacent two of the signal lines corresponds to five of the color resists. Specifically, an interval between the adjacent signal line $TP_1$ and signal line $TP_2$ corresponds to two second color resists CR2, two third color resists CR3, and a first color resist CR1. An interval between the adjacent signal line $TP_2$ and signal line $TP_3$ corresponds to two first color resists CR1, two second color resists CR2, and a third color resist CR3. An interval between the adjacent signal line $TP_3$ and signal line $TP_4$ (not shown) corresponds to two third color resists CR3, two first color resists CR1, and a second color resist CR2.

When a user observes the display panel 10 from a lateral viewing angle from a +X direction toward a −X direction, light reflected by the signal line $TP_1$ and passing through the second color resist CR2, light reflected by the signal line $TP_2$ and passing through the first color resist CR1, and light reflected by the signal line $TP_3$ and passing through the third color resist CR3 are seen at the same time. The above light is mixed into white light. As described above, the structure shown in FIG. 5 is periodically arranged on the first substrate 100. Therefore, when the user observes the display panel 10 from a lateral viewing angle from a +X direction toward a −X direction, white reflected light is seen.

Similarly, when a user observes the display panel 10 from a lateral viewing angle from a −X direction toward a +X direction, light reflected by the signal line $TP_1$ and passing through the first color resist CR1, light reflected by the signal line $TP_2$ and passing through the third color resist CR3, and light reflected by the signal line $TP_3$ and passing through the second color resist CR2 are seen at the same time. The above light is mixed into white light. As described above, the structure shown in FIG. 5 is periodically arranged on the first substrate 100. Therefore, when the user observes the display panel 10 from a lateral viewing angle from a −X direction toward a +X direction, white reflected light is seen.

Color shift at a lateral viewing angle due to reflection from the signal lines does not occur to the display panel 10 of the third embodiment.

Compared to the embodiment shown in FIG. 2, in which the signal lines $TS_1$, $TS_2$ . . . $TS_m$, $TS_{m+1}$ . . . are disposed under the black matrix BM at all boundaries of adjacent color resists CR1, CR2, and CR3, the distribution density of the signal lines $TP_1$, $TP_2$ . . . $TP_m$, $TP_{m+1}$ . . . in the third embodiment shown in FIG. 5 is reduced to one-fifth. Accordingly, problems of light leakage in a dark state and contrast ratio degradation at a front viewing angle or a lateral viewing angle caused by overly high distribution density of signal lines can be avoided.

Figure 6:
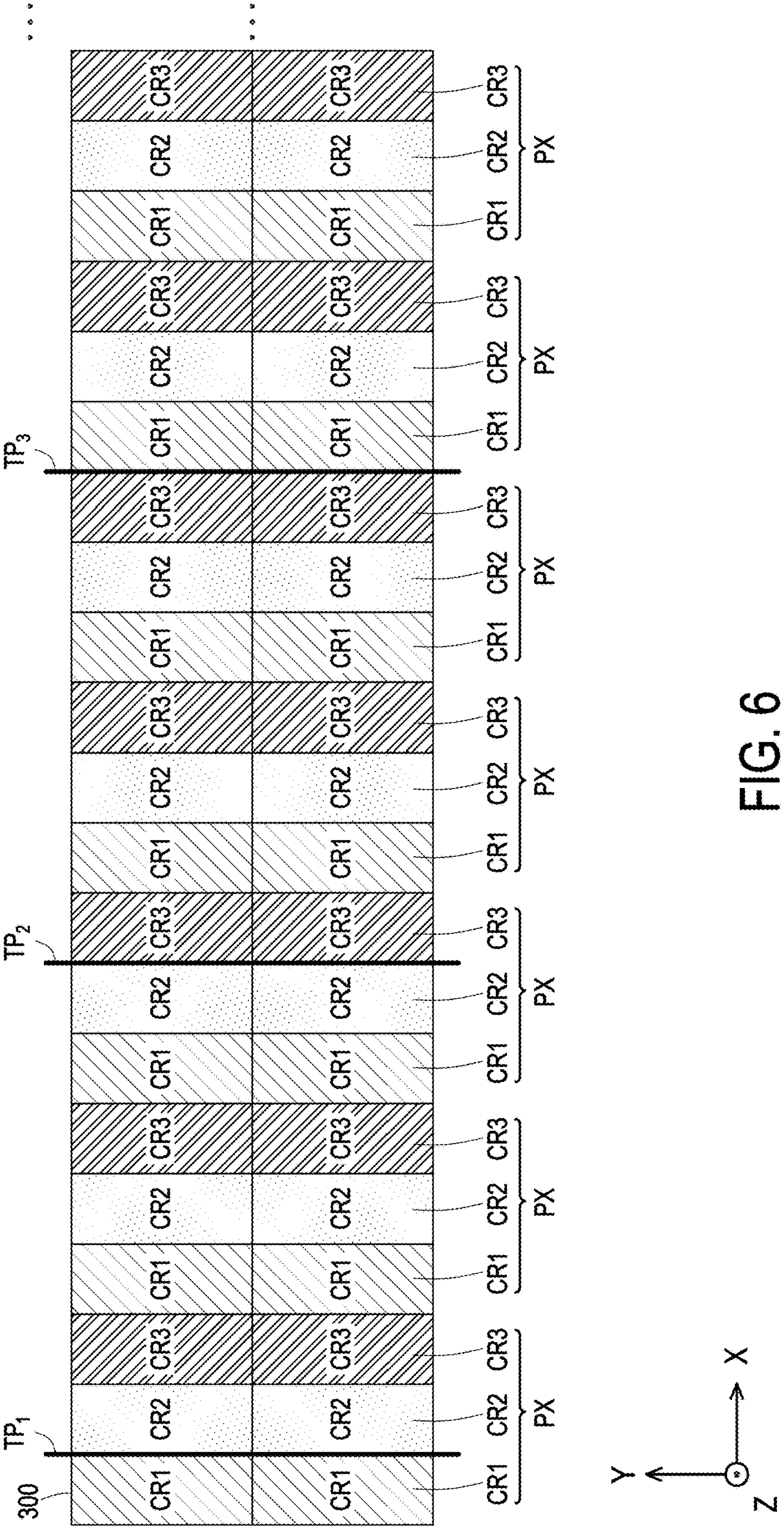
FIG. 6 is a schematic diagram of a display panel according to a fourth embodiment of the disclosure.

Referring to FIG. 1A and FIG. 6, FIG. 6 illustrates a schematic diagram of a display panel according to a fourth embodiment of the disclosure. It should be noted that FIG. 6 merely illustrates a schematic diagram of a partial region of the display panel of the fourth embodiment. In fact, the structure shown in FIG. 6 is periodically arranged on the first substrate 100.

The display panel of the fourth embodiment (FIG. 6) is generally the same in configuration as the display panel of the first embodiment (FIG. 3), and details are not repeated here. The display panel of the fourth embodiment is different from the display panel of the first embodiment in that the signal line $TP_1$ corresponds to a boundary between the first color resist CR1 and the second color resist CR2. The signal line $TP_2$ corresponds to a boundary between the second color resist CR2 and the third color resist CR3. The signal line $TP_3$ corresponds to a boundary between the third color resist CR3 and the first color resist CR1. An interval between adjacent two of the signal lines corresponds to seven of the color resists. Specifically, an interval between the adjacent signal line $TP_1$ and signal line $TP_2$ corresponds to three second color resists CR2, two third color resists CR3, and two first color resists CR1. An interval between the adjacent signal line $TP_2$ and signal line $TP_3$ corresponds to three third color resists CR3, two first color resists CR1, and two second color resists CR2. An interval between the adjacent signal line $TP_3$ and signal line $TP_4$ (not shown) corresponds to three first color resists CR1, two second color resists CR2, and two third color resists CR3.

When a user observes the display panel 10 from a lateral viewing angle from a +X direction toward a −X direction, light reflected by the signal line $TP_1$ and passing through the second color resist CR2, light reflected by the signal line $TP_2$ and passing through the third color resist CR3, and light reflected by the signal line $TP_3$ and passing through the first color resist CR1 are seen at the same time. The above light is mixed into white light. As described above, the structure shown in FIG. 6 is periodically arranged on the first substrate 100. Therefore, when the user observes the display panel 10 from a lateral viewing angle from a +X direction toward a −X direction, white reflected light is seen.

Similarly, when a user observes the display panel 10 from a lateral viewing angle from a −X direction toward a +X direction, light reflected by the signal line $TP_1$ and passing through the first color resist CR1, light reflected by the signal line $TP_2$ and passing through the second color resist CR2, and light reflected by the signal line $TP_3$ and passing through the third color resist CR3 are seen at the same time. The above light is mixed into white light. As described above, the structure shown in FIG. 6 is periodically arranged on the first substrate 100. Therefore, when the user observes the display panel 10 from a lateral viewing angle from a −X direction toward a +X direction, white reflected light is seen.

Color shift at a lateral viewing angle due to reflection from the signal lines does not occur to the display panel 10 of the fourth embodiment.

Compared to the embodiment shown in FIG. 2, in which the signal lines $TS_1$, $TS_2$ . . . $TS_m$, $TS_{m+1}$ . . . are disposed under the black matrix BM at all boundaries of adjacent color resists CR1, CR2, and CR3, the distribution density of the signal lines $TP_1$, $TP_2$ . . . $TP_m$, $TP_{m+1}$ . . . in the fourth embodiment shown in FIG. 6 is reduced to one-seventh. Accordingly, problems of light leakage in a dark state and contrast ratio degradation at a front viewing angle or a lateral viewing angle caused by overly high distribution density of signal lines can be avoided.

It should be noted that, as shown in the first embodiment to the fourth embodiment above, when an interval between adjacent two of the signal lines corresponds to N of the color resists, wherein N is a positive integer greater than 1 and N is not a multiple of 3, problems of light leakage in a dark state and contrast ratio degradation at a front viewing angle or a lateral viewing angle caused by overly high distribution density of signal lines can be avoided, and color shift at a lateral viewing angle due to reflection from the signal lines does not occur to the display panel.

Figure 7:
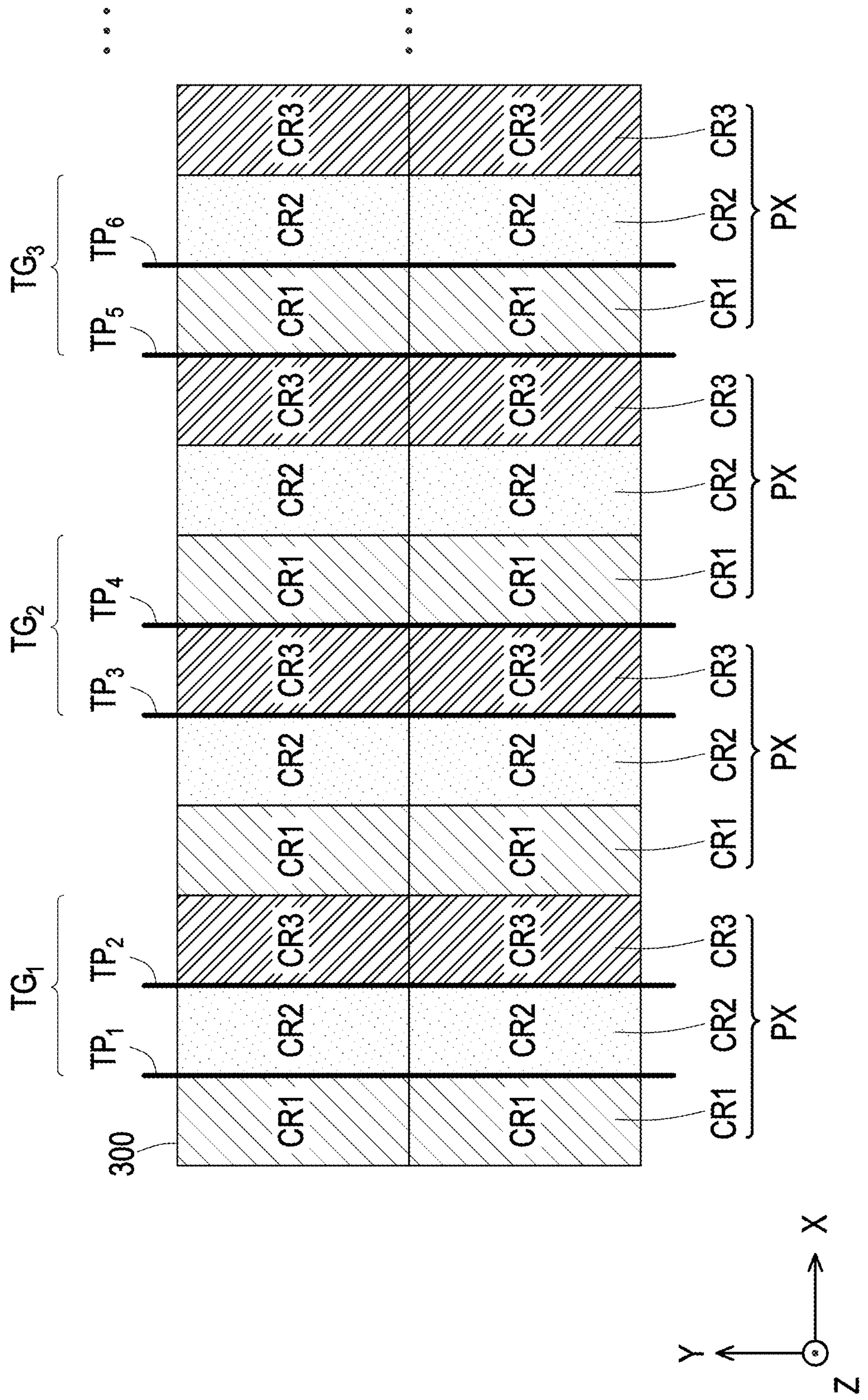
FIG. 7 is a schematic diagram of a display panel according to a fifth embodiment of the disclosure.

Referring to FIG. 1A and FIG. 7, in a fifth embodiment of the disclosure, a display panel 10 includes a first substrate 100, a pixel array layer PL, and a color resist layer 300.

The pixel array layer PL is disposed on a surface of the first substrate 100 and includes a plurality of gate lines of a TFT array, a plurality of data lines of the TFT array, and a plurality of signal lines $TP_1$, $TP_2$ . . . $TP_m$, $TP_{m+1}$ . . . . The signal lines $TP_1$, $TP_2$ . . . $TP_m$, $TP_{m+1}$ . . . can be grouped into a plurality of signal line groups $TG_1$, $TG_2$ . . . $TG_n$, $TG_{n+1}$ . . . . It is particularly noted that the signal lines $TP_1$, $TP_2$ . . . $TP_m$, $TP_{m+1}$ . . . are not the gate lines and the data lines of the TFT array.

In some embodiments, the display panel 10 may be implemented as an embedded touch panel, and the signal lines $TP_1$, $TP_2$ . . . $TP_m$, $TP_{m+1}$ . . . are touch signal lines respectively connected between a plurality of touch sensors SR and a controller DR. However, the disclosure is not limited thereto. In some embodiments, the display panel 10 is not a touch panel, and the signal lines $TP_1$, $TP_2$ . . . $TP_m$, $TP_{m+1}$ . . . may be heating lines used for heating.

The color resist layer 300 is disposed on the pixel array layer PL and includes a plurality of pixel units PX. The pixel units PX are sequentially arranged along an X direction, and each pixel unit PX includes a first color resist CR1, a second color resist CR2, and a third color resist CR3 sequentially arranged along the X direction. The first color resist CR1, the second color resist CR2, and the third color resist CR3 are different in color. In this embodiment, the colors of the first color resist CR1, the second color resist CR2, and the third color resist CR3 are red, green, and blue respectively, but are not limited thereto. In some embodiments, the colors of the first color resist CR1, the second color resist CR2, and the third color resist CR3 are green, blue, and red respectively. In some embodiments, the colors of the first color resist CR1, the second color resist CR2, and the third color resist CR3 are blue, red, and green respectively.

It should be noted that FIG. 7 merely illustrates a schematic diagram of a partial region of the display panel 10. In fact, the structure shown in FIG. 7 is periodically arranged on the first substrate 100.

In this embodiment, each of the plurality of signal line groups $TG_1$, $TG_2$ . . . $TG_n$, $TG_{n+1}$ . . . includes two signal lines arranged along the X direction. As shown in FIG. 7, the signal line group $TG_1$ includes the signal lines $TP_1$ and $TP_2$. The signal line group $TG_2$ includes the signal lines $TP_3$ and $TP_4$. The signal line group $TG_3$ includes the signal lines $TP_5$ and $TP_6$, and so on. Furthermore, an interval between the signal lines $TP_1$ and $TP_{two\ of}$ the signal line group $TG_1$ corresponds to a color resist (the second color resist CR2). An interval between the signal lines $TP_3$ and $TP_4$ of the signal line group $TG_2$ corresponds to a color resist (the third color resist CR3). An interval between the signal lines $TP_5$ and $TP_6$ of the signal line group $TG_3$ corresponds to a color resist (the first color resist CR1).

In addition, an interval between adjacent two of the signal line groups $TG_1$, $TG_2$ . . . $TG_n$, $TG_{n+1}$ . . . corresponds to three of the color resists. Specifically, as shown in FIG. 7, the interval between the two signal line groups $TG_1$ and $TG_2$ corresponds to three of the color resists, and the interval between the two signal line groups $TG_2$ and $TG_3$ corresponds to three of the color resists, and so on.

As shown in FIG. 7, the signal line $TP_1$ corresponds to a boundary between the first color resist CR1 and the second color resist CR2. The signal line $TP_2$ corresponds to a boundary between the second color resist CR2 and the third color resist CR3. The signal line $TP_3$ corresponds to a boundary between the second color resist CR2 and the third color resist CR3. The signal line $TP_4$ corresponds to a boundary between the third color resist CR3 and the first color resist CR1. The signal line TPs corresponds to a boundary between the third color resist CR3 and the first color resist CR1. The signal line $TP_6$ corresponds to a boundary between the first color resist CR1 and the second color resist CR2.

When a user observes the display panel 10 from a lateral viewing angle from a +X direction toward a −X direction, light reflected by the signal line $TP_1$ and passing through the second color resist CR2, light reflected by the signal line $TP_2$ and passing through the third color resist CR3, light reflected by the signal line $TP_3$ and passing through the third color resist CR3, light reflected by the signal line $TP_4$ and passing through the first color resist CR1, light reflected by the signal line $TP_5$ and passing through the first color resist CR1, and light reflected by the signal line $TP_6$ and passing through the second color resist CR2 are seen at the same time. The above light is mixed into white light. As described above, the structure shown in FIG. 7 is periodically arranged on the first substrate 100. Therefore, when the user observes the display panel 10 from a lateral viewing angle from a +X direction toward a −X direction, white reflected light is seen.

Similarly, when a user observes the display panel 10 from a lateral viewing angle from a −X direction toward a +X direction, light reflected by the signal line $TP_1$ and passing through the first color resist CR1, light reflected by the signal line $TP_2$ and passing through the second color resist CR2, light reflected by the signal line $TP_3$ and passing through the second color resist CR2, light reflected by the signal line $TP_4$ and passing through the third color resist CR3, light reflected by the signal line TPs and passing through the third color resist CR3, and light reflected by the signal line $TP_6$ and passing through the first color resist CR1 are seen at the same time. The above light is mixed into white light. As described above, the structure shown in FIG. 7 is periodically arranged on the first substrate 100. Therefore, when the user observes the display panel 10 from a lateral viewing angle from a −X direction toward a +X direction, white reflected light is seen.

Color shift at a lateral viewing angle due to reflection from the signal lines does not occur to the display panel 10 of the fifth embodiment.

Compared to the embodiment shown in FIG. 2, in which the signal lines $TS_1$, $TS_2$ . . . $TS_m$, $TS_{m+1}$ . . . are disposed under the black matrix BM at all boundaries of adjacent color resists CR1, CR2, and CR3, the distribution density of the signal lines $TP_1$, $TP_2$ . . . $TP_m$, $TP_{m+1}$ . . . in the embodiment shown in FIG. 7 is reduced to one-half. Accordingly, problems of light leakage in a dark state and contrast ratio degradation at a front viewing angle or a lateral viewing angle caused by overly high distribution density of signal lines can be avoided.

Figure 8:
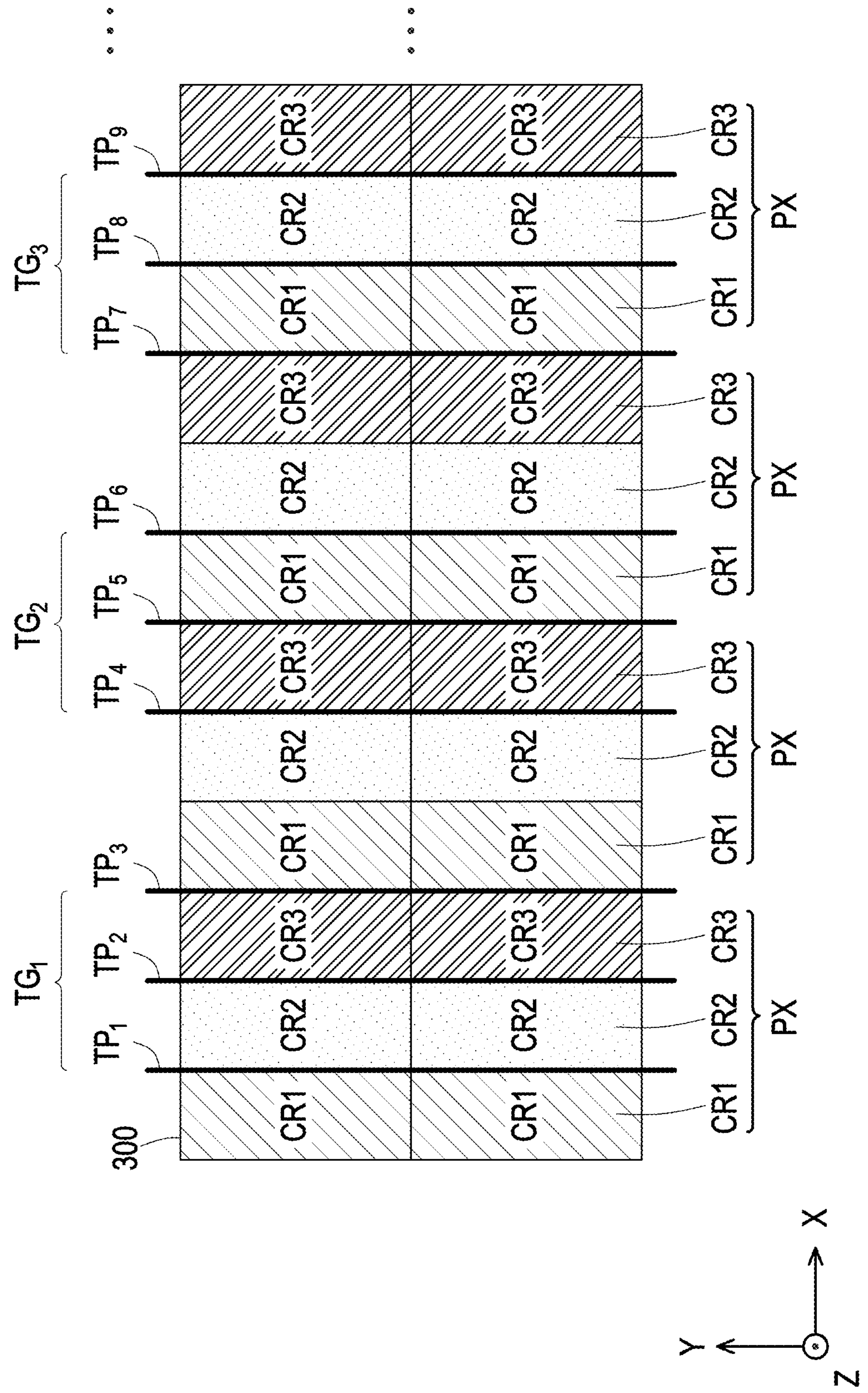
FIG. 8 is a schematic diagram of a display panel according to a sixth embodiment of the disclosure.

Referring to FIG. 1A and FIG. 8, FIG. 8 illustrates a schematic diagram of a display panel according to a sixth embodiment of the disclosure. It should be noted that FIG. 8 merely illustrates a schematic diagram of a partial region of the display panel of the sixth embodiment. In fact, the structure shown in FIG. 8 is periodically arranged on the first substrate 100.

The display panel of the sixth embodiment (FIG. 8) is generally the same in configuration as the display panel of the fifth embodiment (FIG. 7), and details are not repeated here. The display panel of the sixth embodiment is different from the display panel of the fifth embodiment in that each of the plurality of signal line groups $TG_1$, $TG_2$ . . . $TG_n$, $TG_{n+1}$ . . . includes 3 signal lines arranged along the X direction. As shown in FIG. 8, the signal line group $TG_1$ includes the signal lines $TP_1$, $TP_2$, and $TP_3$. The signal line group $TG_2$ includes the signal lines $TP_4$, $TP_5$, and $TP_6$. The signal line group $TG_3$ includes the signal lines $TP_7$, $TP_8$, and $TP_9$, and so on. Furthermore, each interval between the signal lines $TP_1$, $TP_2$, and $TP_3$ in the signal line group $TG_1$ corresponds to a color resist. Each interval between the signal lines $TP_4$, $TP_5$, and $TP_6$ in the signal line group $TG_2$ corresponds to a color resist. Each interval between the signal lines $TP_7$, $TP_8$, and $TP_9$ in the signal line group $TG_3$ corresponds to a color resist.

In addition, an interval between adjacent two of the signal line groups $TG_1$, $TG_2$ . . . $TG_n$, $TG_{n+1}$ . . . corresponds to two of the color resists. Specifically, as shown in FIG. 8, the interval between the two signal line groups $TG_1$ and $TG_2$ corresponds to two of the color resists, and the interval between the two signal line groups $TG_2$ and $TG_3$ corresponds to two of the color resists.

As shown in FIG. 8, the signal line $TP_1$ corresponds to a boundary between the first color resist CR1 and the second color resist CR2. The signal line $TP_2$ corresponds to a boundary between the second color resist CR2 and the third color resist CR3. The signal line $TP_3$ corresponds to a boundary between the third color resist CR3 and the first color resist CR1. The signal line $TP_4$ corresponds to a boundary between the second color resist CR2 and the third color resist CR3. The signal line $TP_5$ corresponds to a boundary between the third color resist CR3 and the first color resist CR1. The signal line $TP_6$ corresponds to a boundary between the first color resist CR1 and the second color resist CR2. The signal line $TP_7$ corresponds to a boundary between the third color resist CR3 and the first color resist CR1. The signal line $TP_8$ corresponds to a boundary between the first color resist CR1 and the second color resist CR2. The signal line $TP_9$ corresponds to a boundary between the second color resist CR2 and the third color resist CR3.

When a user observes the display panel 10 from a lateral viewing angle from a +X direction toward a −X direction, light reflected by the signal line $TP_1$ and passing through the second color resist CR2, light reflected by the signal line $TP_2$ and passing through the third color resist CR3, light reflected by the signal line $TP_3$ and passing through the first color resist CR1, light reflected by the signal line $TP_4$ and passing through the third color resist CR3, light reflected by the signal line TPs and passing through the first color resist CR1, light reflected by the signal line $TP_6$ and passing through the second color resist CR2, light reflected by the signal line $TP_7$ and passing through the first color resist CR1, light reflected by the signal line $TP_8$ and passing through the second color resist CR2, and light reflected by the signal line $TP_9$ and passing through the third color resist CR3 are seen at the same time. The above light is mixed into white light. As described above, the structure shown in FIG. 8 is periodically arranged on the first substrate 100. Therefore, when the user observes the display panel 10 from a lateral viewing angle from a +X direction toward a −X direction, white reflected light is seen.

Similarly, when a user observes the display panel 10 from a lateral viewing angle from a −X direction toward a +X direction, light reflected by the signal line $TP_1$ and passing through the first color resist CR1, light reflected by the signal line $TP_2$ and passing through the second color resist CR2, light reflected by the signal line $TP_3$ and passing through the third color resist CR3, light reflected by the signal line $TP_4$ and passing through the second color resist CR2, light reflected by the signal line $TP_5$ and passing through the third color resist CR3, light reflected by the signal line $TP_6$ and passing through the first color resist CR1, light reflected by the signal line $TP_7$ and passing through the third color resist CR3, light reflected by the signal line $TP_8$ and passing through the first color resist CR1, and light reflected by the signal line $TP_9$ and passing through the second color resist CR2 are seen at the same time. The above light is mixed into white light. As described above, the structure shown in FIG. 8 is periodically arranged on the first substrate 100. Therefore, when the user observes the display panel 10 from a lateral viewing angle from a −X direction toward a +X direction, white reflected light is seen.

Color shift at a lateral viewing angle due to reflection from the signal lines does not occur to the display panel 10 of the sixth embodiment.

Compared to the embodiment shown in FIG. 2, in which the signal lines $TS_1$, $TS_2$ . . . $TS_m$, $TS_{m+1}$ . . . are disposed under the black matrix BM at all boundaries of adjacent color resists CR1, CR2, and CR3, the distribution density of the signal lines $TP_1$, $TP_2$ . . . $TP_m$, $TP_{m+1}$ . . . in the embodiment shown in FIG. 7 is reduced to three-fourths. Accordingly, problems of light leakage in a dark state and contrast ratio degradation at a front viewing angle or a lateral viewing angle caused by overly high distribution density of signal lines can be avoided.

It should be noted that, as shown in the fifth embodiment to the sixth embodiment above, when each signal line group includes M signal lines, and an interval between adjacent signal line groups corresponds to N of the color resists, wherein M is a positive integer greater than 1, a sum of M and N is a positive integer greater than 3, and the sum of M and N is not a multiple of 3, problems of light leakage in a dark state and contrast ratio degradation at a front viewing angle or a lateral viewing angle caused by overly high distribution density of signal lines can be avoided, and color shift at a lateral viewing angle due to reflection from the signal lines does not occur to the display panel.

In summary, the display panel provided in the embodiments of the disclosure has a special signal line configuration. A signal line does not need to be disposed at each color resist boundary, thereby avoiding problems of light leakage in a dark state and contrast ratio degradation at a front viewing angle or a lateral viewing angle, and also avoiding color shift at a lateral viewing angle due to reflection from the signal lines.

What is claimed is:

1. A display panel, comprising:

a substrate, having a surface;

a pixel array layer, disposed on the surface and comprising a plurality of signal lines arranged along a first direction; and a color resist layer, disposed on the pixel array layer and comprising a plurality of pixel units, wherein the plurality of pixel units are sequentially arranged along the first direction, and each of the plurality of pixel units comprises a plurality of color resists, the plurality of color resists of each of the plurality of pixel units are composed of a first color resist, a second color resist, and a third color resist sequentially arranged along the first direction, wherein the first color resist, the second color resist, and the third color resist are different in color, wherein the plurality of signal lines are a plurality of touch signal lines or a plurality of heating lines, wherein each of the plurality of signal lines corresponds to a boundary between the first color resist and the second color resist, a boundary between the second color resist and the third color resist, or a boundary between the third color resist and the first color resist, and wherein an interval between adjacent two of the plurality of signal lines corresponds to N of the plurality of color resists, N=2, N=5, or N=7.

2. The display panel according to claim 1, wherein when the display panel is observed from a lateral viewing angle along the first direction, the display panel provides a white light.

3. A display panel, comprising:

a substrate, having a surface;

a pixel array layer, disposed on the surface and comprising a plurality of signal line groups arranged along a first direction, wherein each of the plurality of signal line groups comprises M signal lines arranged along the first direction, and M is a positive integer greater than 1; and a color resist layer, disposed on the pixel array layer and comprising a plurality of pixel units, wherein the plurality of pixel units are sequentially arranged along the first direction, and each of the plurality of pixel units comprises a plurality of color resists, the plurality of color resists of each of the plurality of pixel units are composed of a first color resist, a second color resist, and a third color resist sequentially arranged along the first direction, wherein the first color resist, the second color resist, and the third color resist are different in color, wherein the plurality of signal lines are a plurality of touch signal lines or a plurality of heating lines, wherein each of the plurality of signal lines corresponds to a boundary between the first color resist and the second color resist, a boundary between the second color resist and the third color resist, or a boundary between the third color resist and the first color resist, an interval between adjacent two of the M signal lines in each of the plurality of signal line groups corresponds to one of the plurality of color resists, an interval between adjacent two of the plurality of signal line groups corresponds to N of the plurality of color resists, and a sum of M and N is a positive integer greater than 3, and the sum of M and N is not a multiple of 3.

4. The display panel according to claim 3, wherein the sum of M and Nis 5.

5. The display panel according to claim 3, wherein M=2 and N=3.

6. The display panel according to claim 3, wherein M=3 and N=2.

7. The display panel according to claim 3, wherein when the display panel is observed from a lateral viewing angle along the first direction, the display panel provides a white light.

* * * * *